(No Model.) 2 Sheets—Sheet 1.
H. N. TIMMS.
POLE AND SHAFT FOR VEHICLES.
No. 313,128. Patented Mar. 3, 1885.
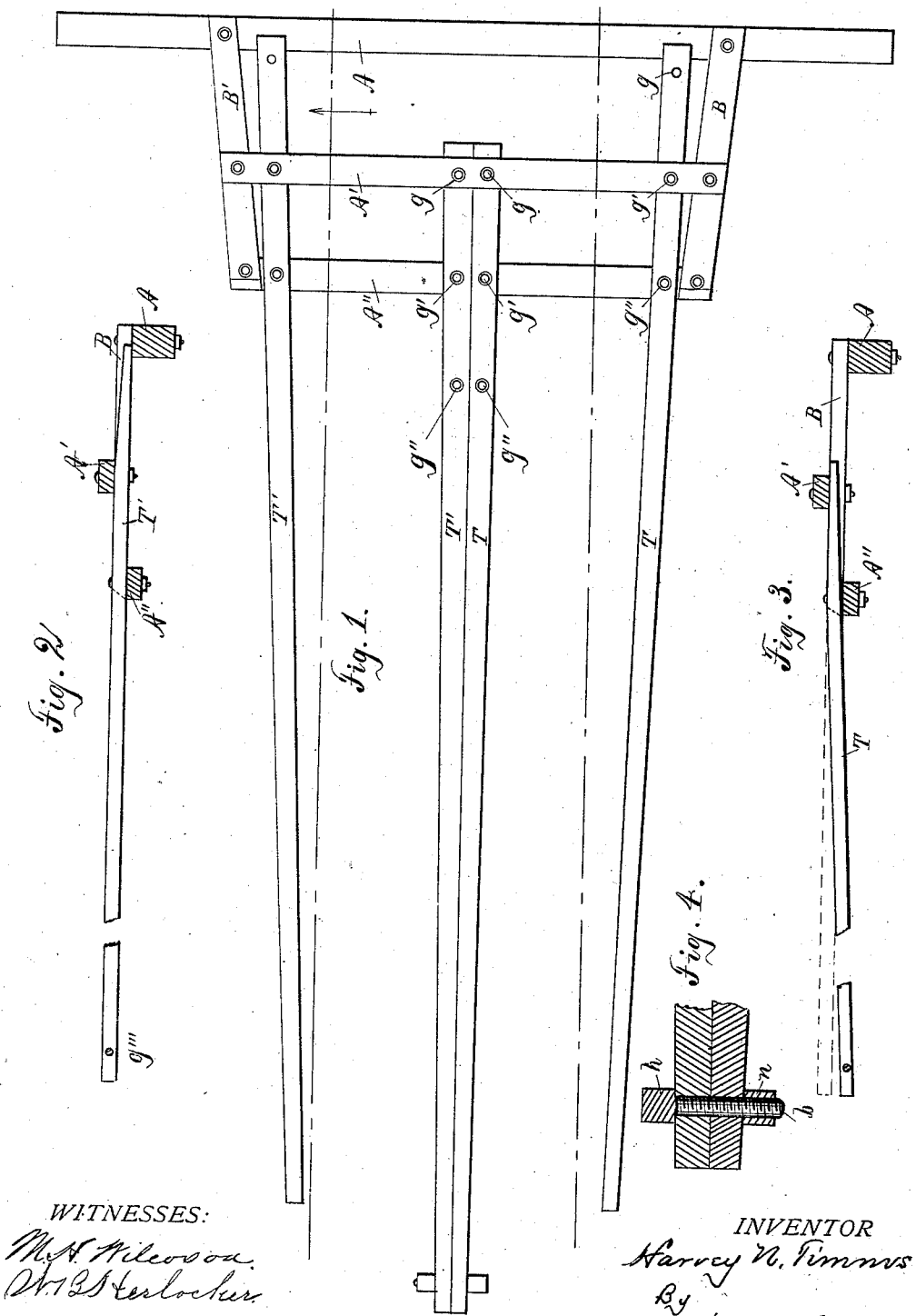
WITNESSES:
INVENTOR
Harvey N. Timms
By
Wiles & Greene
ATTORNEY (No Model.) 2 Sheets—Sheet 2.
H. N. TIMMS.
POLE AND SHAFT FOR VEHICLES.
No. 313,128. Patented Mar. 3, 1885.
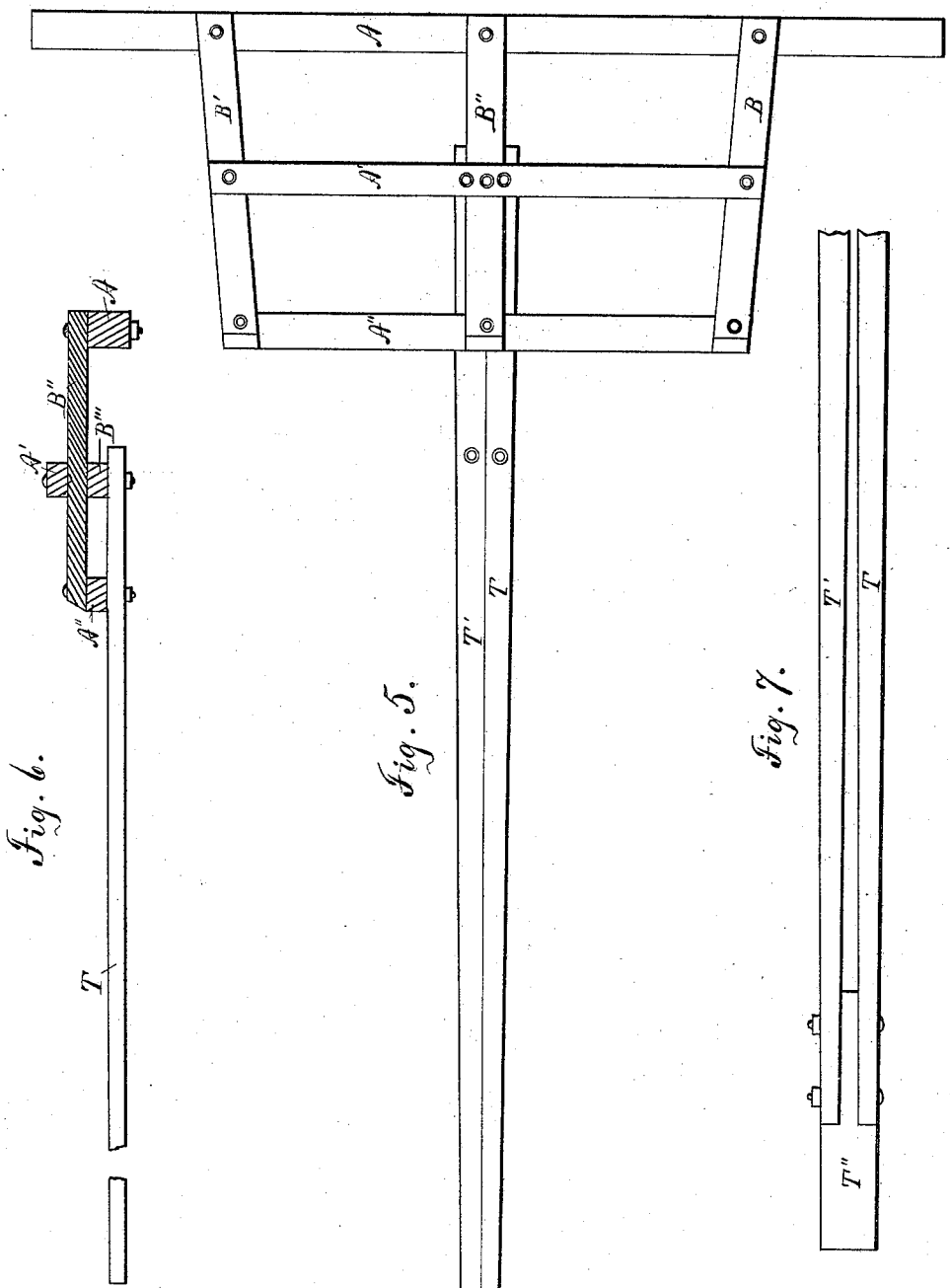
WITNESSES:
INVENTOR
Harvey N. Timms
By Wiles & Greene
ATTORNEYS ated October 20, 1884. (No model.)

UNITED STATES PATENT OFFICE.

HARVEY N. TIMMS, OF STEPHENSON COUNTY, ILLINOIS.

POLE AND SHAFT FOR VEHICLES.

SPECIFICATION forming part of Letters Patent No. 313,128, dated March 3, 1885.

Application filed October 20, 1884. (No model.)

*To all whom it may concern:*

Be it known that I, HARVEY N. TIMMS, a resident of the county of Stephenson and State of Illinois, have invented certain new and useful Improvements in Interconvertible Poles and Shafts; and I do hereby declare the following to be a full, clear, and exact description of the invention, such as will enable others skilled in the art to which it pertains to make and use the same.

My invention is an improved form of interconvertible tongue and shafts, especially adapted for use with hay-rakes and other agricultural implements. It is fully described, explained, and claimed in the following specification and shown in the accompanying drawings, in which—

Figure 1 is a plan showing both pole and shafts attached to the axle of an ordinary rake; Fig. 2, a vertical section through line $x\ y$, Fig. 1, looking in the direction indicated by the arrow $a$, Fig. 1; Fig. 3, a central vertical section of Fig. 1; Fig. 4, a central horizontal section of the pole-tip and connecting-bolt shown in Fig. 1; Fig. 5, a plan of the detachable pole attached to an axle in a different manner from that shown in Fig. 1; Fig. 6, a central vertical section of Fig. 5, and Fig. 7 a plan of a pole provided with an extension-tip.

In these views A is the axle of an ordinary horse-rake. B B' are two preferably converging side bars bolted to the top of the axle and extending forward therefrom; and A' A'', two cross-bars parallel with the axle and lying, respectively, over and under the side bars, B B', to which they are securely bolted.

Figs. 1, 2, 3, and 4 illustrate the manner in which the thills and tongue are secured to the cross-bars A' A'' when no center bar is placed at the center of the frame and between the side bars, B B', while Figs. 5 and 6 show the manner of attaching when a center bar is used.

In Fig. 1, T T' are two thills, of suitable dimensions, securely bolted to the cross-bars A' A'', the front end of each thill extending forward a proper distance from the bar A'', while its rear portion lies over the cross-bar A'' and under the cross-bar A', and is preferably extended back sufficiently to lap on the axle A, to which, however, it is not bolted. The rear part of each thill is pierced by three vertical bolt-holes, $g\ g'\ g''$, placed at equal intervals, and bolts pass through the holes $g'\ g''$ and the cross-bars A' A'', respectively.

When it is desired to convert the thills into a pole, the bolts are taken from the holes $g'\ g''$, the thills are brought together at the center of the frame and moved forward until the holes $g\ g'$ coincide with suitably placed holes in the cross-bars A' A'', and the bolts being passed through the holes $g\ g'$ are drawn up and secure the pole in position. A hole, $g'''$, Fig. 2, is bored horizontally through the pole thus formed, near its tip, and through this hole is passed a screw-threaded bolt, $b$, provided with a head, $h$, and nut $n$, of sufficient length to form a stop for the neck-yoke, the length of the bolt being such that the nut $n$ completely covers and protects its thread, and thus prevents its injury by the neck-yoke. The transverse bolt $b$ binds together the ends of the thills, and with the bolts in the holes $g\ g'$ forms a rigid pole braced sufficiently to dispense with any side braces of any kind.

From Fig. 2 it will be seen that the upper face of each thill is chamfered down in rear of the cross-bar A', so that the thickness of the rear end of the thill is considerably lessened. When the thills are united to form a pole and are moved forward as described above, this chamfering down of the rear end of the thills drops the front end of the pole down, as shown in Fig. 3, in which the dotted lines indicate the level of the thills, while the full lines show the position of the pole.

In order to give the pole a full bearing on the cross-bar A'', the latter is beveled slightly at the center, as shown in Fig. 3.

In many forms of rakes a center bar, B'', is attached to the axle and cross-bars A A' A'', as shown in Fig. 5. Where this center bar is used, it is necessary, in order to place the rear ends of the thills in contact when used as a pole, that they be attached somewhat differently to the center of the cross-bars. This is accomplished by placing under the center bar, B'', and preferably directly under the cross-bar A', a block, B''', Fig. 6, of sufficient width to receive the ends of both thills, and by bolting both thills to the lower face of the block B''' and cross-bar A''. The bolt-holes in the thills are placed the same as those shown in Fig. 1, and when used as thills they are attached in the same manner represented in Figs. 1 and 2.

The block B''' and cross-bar A'' may be made of such thickness as to drop the pole sufficiently below the thill-level, or the necessary depression may be obtained by cutting down the rear ends of the thills, as shown in Fig. 6.

Fig. 7 shows a means of lengthening the pole, if found necessary in any case, T T' being the thills, and T'' an extension-tip the rear end of which is bolted between the thills, while its front part extends forward from the end of the thills and forms the end of the pole. With this tip the bolt $b$ (shown in Fig. 4) may be used, or any other neck-yoke stop may be attached.

In the foregoing description the bar A has been spoken of as the axle; but in many forms of rakes this bar will not be the axle, but a rake-head hinged to the axle, while in others it will be simply a bar hinged to the axle, the rake-teeth being fastened to the axle. These differences of construction make no difference, however, with the principle of this invention, since they do not alter in any way the attachment of the thills and pole to the cross-bars A' A'' in front of the axle.

I am aware that it is not broadly novel to combine with a vehicle or agricultural implement a pair of shafts adapted to be connected and form a pole, since such a combination is shown and described in the patent of Edwin E. Leach, dated June 20, 1876. In the construction shown in that patent, however, the rear ends of the thills are connected with the axle, or with a bar hinged to the axle, by means of horizontally-swinging pivoted plates adapted to swing forward to permit the lengthening of the thills. When the thills are separated, they are rigidly fastened to a cross-bar in front of the axle, corresponding to the cross-bar A'' in the drawings herewith, and to the axle; but when they are connected to form a pole the rear ends of the thills are only held in place by the pivot-joints connecting them with the swinging plates referred to. In the construction shown in this application, however, the second cross-bar, A', affords a means of rigidly bolting the thills in place, either when separated or when united in a pole, and for this reason I consider this construction much superior to that shown in the patent referred to.

Having now described my invention, what I claim as new, and desire to secure by Letters Patent, is—

1. The combination of two cross-bars connected with the axle of a rake or other agricultural implement, in front thereof and preferably parallel thereto, two thills adapted to be fastened to said cross-bars at suitable distances on either side of the center thereof and to extend back from the rear cross-bar when so attached, and also adapted to be brought together at the center of said cross-bars and moved forward to form a pole, and to be bolted to said cross-bars in either of the positions described, substantially as and for the purpose set forth.

2. The combination of the side bars, B B', cross-bars A' A'', and the thills T T', provided with bolt-holes $g\ g'\ g''$, substantially as shown and described, and for the purpose set forth.

3. The combination of the side bars, B B', cross-bars A' A'', and the thills T T', having their rear ends reduced in thickness, substantially as shown and described, whereby when moved forward to form a pole their front ends are depressed, substantially as and for the purpose set forth.

4. The combination, with the cross-bars A' A'', of the pole formed of the thills T T', each of said thills being bolted to both of said cross-bars, and the front ends of said thills being rigidly connected, whereby the pole is rigidly braced to the cross-bars, substantially as shown and described, and for the purpose set forth.

In testimony whereof I have signed this specification in the presence of two subscribing witnesses.

HARVEY N. TIMMS.

Witnesses:
F. A. PERCIVAL,
B. S. WALKER.